July 28, 1942.                S. R. NAYSMITH                2,291,492
                                  SUPPORT
                            Filed May 23, 1941           2 Sheets-Sheet 1

INVENTOR
SHIRLEY R. NAYSMITH
BY
ATTORNEY

July 28, 1942.　　　S. R. NAYSMITH　　　2,291,492
SUPPORT
Filed May 23, 1941　　　2 Sheets-Sheet 2
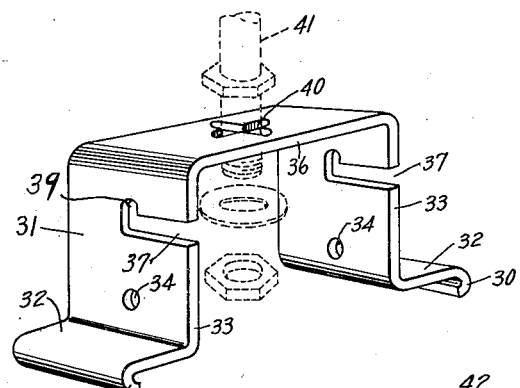
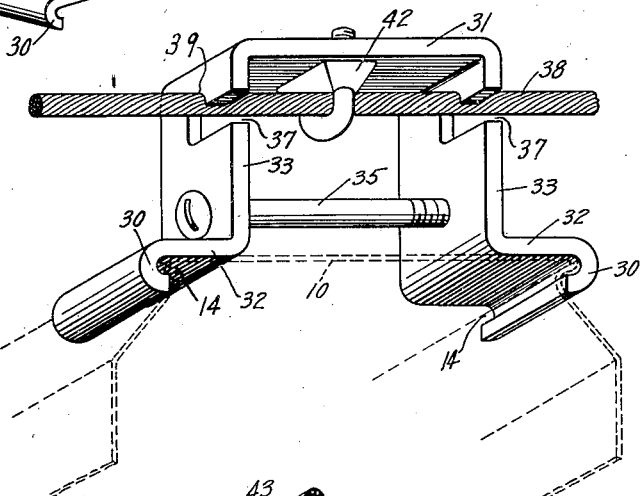
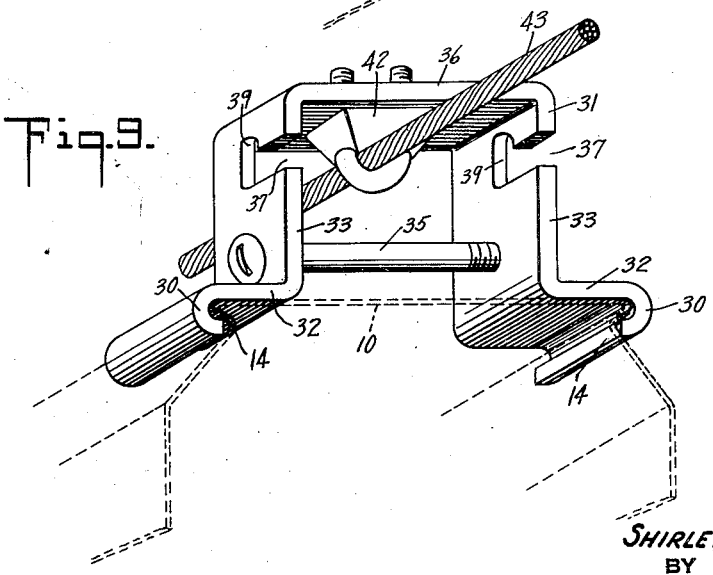
INVENTOR
SHIRLEY R. NAYSMITH
BY
ATTORNEY Patented July 28, 1942

2,291,492

UNITED STATES PATENT OFFICE 2,291,492

SUPPORT

Shirley R. Naysmith, Meriden, Conn., assignor to The Miller Company, Meriden, Conn., a corporation of Connecticut Application May 23, 1941, Serial No. 394,814

10 Claims. (Cl. 248—317)

The present invention relates to supports, and is more particularly directed toward supports for fluorescent lighting equipment.

The present application is a continuation in part of my pending applications Serial Nos. 376,780 and 376,781 filed January 31, 1941.

The lighting equipment referred to in the above-entitled applications employs long inverted sheet metal troughs or wiring to support the fluorescent lamp auxiliaries, the fluorescent lamp sockets, lamps and the reflectors. This lighting equipment must be mounted at the proper height above the working plane and at the proper spacing to provide the lighting intensities desired and is supported from above. The present invention relates to supports suitable for hanging such lighting equipment under the various conditions which may arise in practice.

According to the present invention the wiring troughs are provided with longitudinally extending, downwardly facing shoulders, which may conveniently be in the form of beads, and these shoulders are engaged by oppositely facing hook shaped elements adapted to be clamped together and against the troughs or wiring channels. These hook shaped members are employed for supporting the channels and are designed so that the same supporting device secured to the wiring channels is suitable for supporting them from various forms of overhead structure available or provided for the purpose.

The present invention makes it possible to attach the supports at any convenient spacing along the troughs without passing through holes in the trough or interfering in any way with the apparatus in the trough. The supports and enclosed apparatus may be located at the most convenient points for the respective parts.

The accompanying drawings show two principal forms of the invention, together with several adaptations for the use of these forms under varying conditions, it being understood that the drawings are illustrative of the invention rather than limiting the same.

In these drawings:

Figure 7 is a perspective view of a modified form of support; and

Figures 8 and 9 illustrate two ways in which the support of Figure 7 may be employed.

Figure 1:
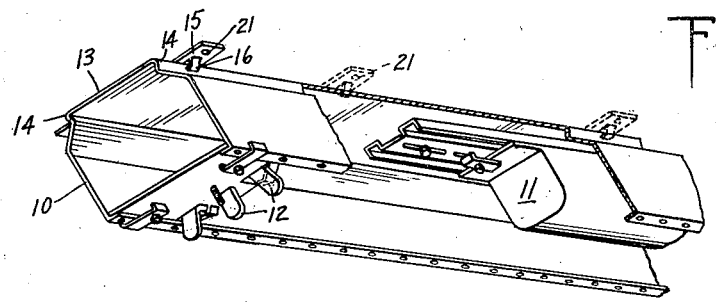
Figure 1 is a fragmentary perspective view of a wiring channel showing a form of support.

A wiring channel or trough is illustrated in the drawings at 10. This trough may be made up in sections and assembled so as to be of indefinite length as explained in the applications above referred to. It carries fluorescent lamp auxiliaries indicated at 11, fluorescent lamp sockets indicated at 12, and lamps and reflectors not shown. The top of the trough or wiring channel 10 is usually made flat, as indicated at 13, and has two parallel longitudinally extending beads 14, 14 coextensive with the length of the trough. Other formations such as flanges and grooves may be employed to furnish the shoulder for engagement by the forms of support to be described.

In the construction shown in Figures 1 to 5, inclusive, the supports include two heavy sheet metal straps 15, 15 having downwardly bent ears 16, 16 to form hook shaped members and upwardly bent elements 17, 17 adapted to carry a bolt 18 with nut 19 spaced above the top of the wiring channel. The hooks engage under the shoulder formed by the bead and preferably reach the bottom of the groove. In this form of construction the upwardly extending elements 17, 17 are preferably bent out of the middle of the strap so as to leave inwardly extending elements 20, 20 which overlie the top of the trough. The two members 15, 15 with clamping bolt 18 may be placed anywhere along the length of the wiring channel and firmly secured in place by merely tightening the nut.

Figure 2:
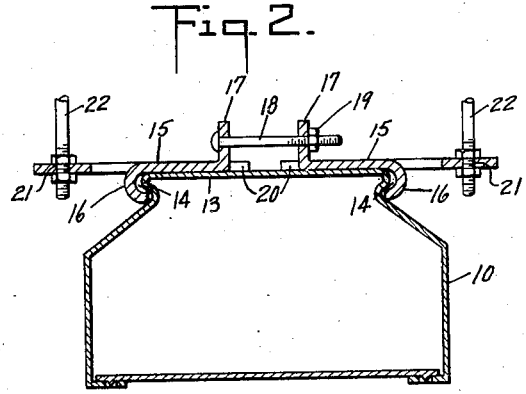
Figure 2 is a cross sectional view through the support and wiring channel of Figure 1.
Figure 3:
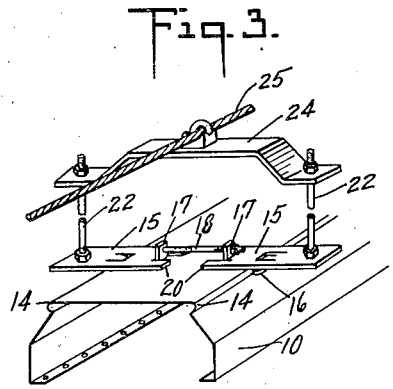
Figures 3, 4, 5 and 6 are perspective views showing various uses of the support of Figure 1.
Figure 4:
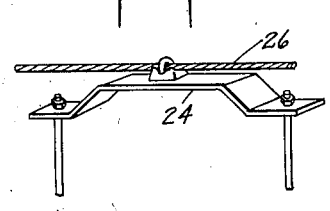
Figure 5:
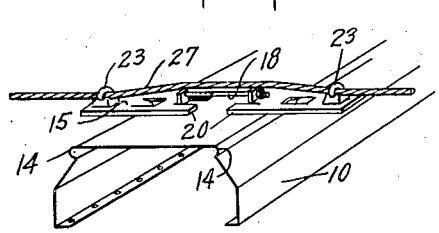
Figure 6:
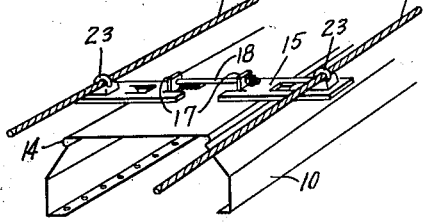

The upper ends of the straps 15, 15 are provided with holes indicated at 21. These holes may be used as shown in Figures 2 and 3 for the support of hanger rods 22, 22, or they may be used as shown in Figures 5 and 6 to receive cable clamps 23, 23. Where two hanger rods, such as 22, 22, are used they may be fastened to cross strap 24, and this cross strap may be supported from any convenient structure or from a longitudinally extending cable such as indicated at 25 in Figure 3, or a transversely extending cable such as indicated at 26 in Figure 4. Where the cable clamps 23, 23 are employed they may be used with transversely extending cables such as indicated at 27, or longitudinally extending cables such as indicated at 28, 28 of Figure 6. It is thus apparent that by means of the equipment shown in Figures 1 to 6, inclusive, the lighting equipment required for an installation may be readily supported from various forms of overhead structure or from cables either extending parallel with the troughs or transversely of the troughs.

In the form shown in Figures 7, 8 and 9 the same trough or wiring channel 10 is employed. Here the beads 14, 14 of the wiring channel are received within hooks 30, 30 carried at the lower outer ends of an inverted U-shaped strap 31. This U-shaped strap has horizontal lower elements 32, 32 which rest on top of the wiring channel, two upwardly extending elements 33, 33 provided with holes 34 to receive a bolt 35 and a top portion 36. The support of Figures 7, 8 and 9 may be secured anywhere along the length of the wiring channel and clamped securely in place by the bolt. This U-shaped strap type of support may be provided with laterally opening slots 37, 37 for the reception of a cable 38 extending transversely of the trough, and in this case the slots preferably have a slight upward extension, shown at 39. The top wall 36 of the U-shaped support is preferably provided with a cruciform opening 40 adapted to receive a hanger rod 41 or a cable clamp 42. When the cable clamp is in the position shown in Figure 8 it passes about the cable 38 and serves to clamp the support against movement lengthwise of the cable. When the clamp 42 is in the position shown in Figure 9 it is suitable for supporting the apparatus from a longitudinally supporting cable indicated at 43.

It is obvious that the invention may be embodied in many forms and constructions within the scope of the claims and I wish it to be understood that the particular forms shown are but a few of the many forms. Various modifications and changes being possible, I do not otherwise limit myself in any way with respect thereto.

What is claimed is:

1. In combination, an inverted sheet metal, wiring trough having two parallel longitudinally extending, downwardly facing shoulders spaced apart a substantial distance and separated by a flat, stiff upper wall, and trough supports each including a pair of opposed hooks separable to admit the shouldered portion of the trough therebetween and upwardly extending apertured elements spaced less than the width of the said wall, and a cross bolt passing through said apertured elements for drawing said apertured elements closer together and forcing the hooks against the trough with the ends of the hooks under the shoulders to fixedly secure the supports in place at selected positions along the trough.

2. In combination, an inverted sheet metal, wiring trough having two parallel longitudinally extending, downwardly facing shoulders spaced apart a substantial distance and separated by a flat, stiff upper wall, and trough supports including inverted U-shaped straps each having hooks separable to admit the shouldered portion of the trough therebetween and cross bolts between the sides of the U above the top of the trough for clamping the hooks against the trough with the ends of the hooks under the shoulders to fixedly secure the supports in place at selected positions along the trough.

3. The combination claimed in claim 2, wherein the sides of the U above the bolt have laterally opening slots adapted to receive a cable extending transversely of the trough.

4. The combination claimed in claim 2, wherein the top of each U-shaped strap is apertured and a cable clamp is secured in the said aperture.

5. A support for lighting fixture troughs comprising a rigid metal strap having a top portion, two depending sides each provided with a laterally opening slot, and a bolt hole, two outwardly extending parts at the bottom of the sides, each terminating in a downward and inwardly facing hook, and a bolt in the bolt holes for forcing the hooks inwardly.

6. A support for lighting fixture troughs comprising a rigid metal strap having a top portion, two depending sides each provided with a laterally opening slot, and a bolt hole, two outwardly extending parts at the bottom of the sides, each terminating in an inwardly facing hook, a bolt in the bolt holes for forcing the hooks inwardly, and a cable clamp carried by the top portion and positioned to receive a cable extending through the slots.

7. In combination, an inverted sheet metal, wiring trough having a flat, stiff upper wall extending to two parallel longitudinally extending, downwardly facing shoulders and side walls below the shoulders, and trough supports each having two hooks extending under the shoulders and two upwardly extending elements spaced closer than the hooks, and a bolt for drawing the two upwardly extending elements together to fixedly secure the supports in place at selected positions along the trough.

8. The combination claimed in claim 7, wherein the upwardly extending elements of the supports are the lower portions of inverted U-shaped straps.

9. The combination claimed in claim 7, wherein the trough supports extend outwardly beyond the hooks and are apertured to receive suspension devices.

10. In combination, an inverted trough having two parallel longitudinally extending, downwardly facing shoulders separated by a stiff, upper wall, and trough supports each adapted to be fixedly secured in place at a selected position along the trough and comprising spaced clamp elements having opposed hooks and bolt means connecting said elements to draw the elements toward one another to firmly engage the hooks under said shoulders.

SHIRLEY R. NAYSMITH.